US012525392B2

(12) United States Patent
Imazato et al.

(10) Patent No.: US 12,525,392 B2
(45) Date of Patent: Jan. 13, 2026

(54) CURRENT TRANSFORMER MODULE

(71) Applicant: SHT Corporation Limited, Izumisano (JP)

(72) Inventors: Yuichi Imazato, Izumisano (JP); Kazuhiro Kasatani, Izumisano (JP); Kazusa Mori, Izumisano (JP)

(73) Assignee: SHT CORPORATION LIMITED, Osaka (JP)

( * ) Notice: Subject to any disclaimer, the term of this patent is extended or adjusted under 35 U.S.C. 154(b) by 1025 days.

(21) Appl. No.: 17/630,410

(22) PCT Filed: Jun. 23, 2020

(86) PCT No.: PCT/JP2020/024550

§ 371 (c)(1),
(2) Date: Jan. 26, 2022

(87) PCT Pub. No.: WO2021/019964

PCT Pub. Date: Feb. 4, 2021

(65) Prior Publication Data

US 2022/0285090 A1 Sep. 8, 2022

(30) Foreign Application Priority Data

Jul. 31, 2019 (JP) ................................. 2019-140980

(51) Int. Cl.
*H01F 38/30* (2006.01)
*H01F 27/02* (2006.01)
(Continued)

(52) U.S. Cl.
CPC ............. *H01F 38/30* (2013.01); *H01F 27/02* (2013.01); *H01F 27/266* (2013.01); *H01F 27/28* (2013.01); *H01F 27/32* (2013.01)

(58) Field of Classification Search
CPC ........ H01F 38/30; H01F 27/02; H01F 27/266; H01F 27/28; H01F 27/32; H01F 27/325
(Continued)

(56) References Cited

U.S. PATENT DOCUMENTS 6,008,712 A * 12/1999 Tokuda ................. H01F 27/324 336/208
6,091,590 A * 7/2000 Sakamoto ............... F16D 27/14 336/208
(Continued)

FOREIGN PATENT DOCUMENTS

CN 2639896 Y * 9/2004
CN 203 325 703 U 12/2013
(Continued)

OTHER PUBLICATIONS

Japanese Patent Office "International Search Report" from Japanese priority application PCT/JP2020/024550, Aug. 25, 2020 (Aug. 25, 2020), 5 pp.

(Continued)

*Primary Examiner* — Shawki S Ismail
(74) *Attorney, Agent, or Firm* — Eckert Seamans Cherin & Mellott, LLC

(57) ABSTRACT

The present invention provides a current transformer module that can achieve downsizing and keeping the creepage distance of insulation simultaneously. The current transformer module 12 according to the present invention comprises a current transformer 10 and a casing 80 for housing the current transformer, wherein the current transformer includes a resin-made bobbin 20 with a through hollow section 21 and a core 30 having legs 42 inserted at least into the hollow section, the bobbin having a primary coil 26 and a wire-wound secondary coil 27 on the outer periphery of the hollow section, wherein the bobbin has insulation walls 22, 24 between the primary coil and the secondary coil wherein
(Continued)

the insulation wall has recesses 23,25, and wherein the casing are provided with protrusions 83, 87 adapted to fit into the recesses.

3 Claims, 11 Drawing Sheets

(51) Int. Cl.
*H01F 27/26* (2006.01)
*H01F 27/28* (2006.01)
*H01F 27/32* (2006.01)

(58) Field of Classification Search
USPC .............................................. 336/90, 92, 198
See application file for complete search history.

(56) References Cited

U.S. PATENT DOCUMENTS

| | | | | |
|---|---|---|---|---|
| 6,504,465 | B2 * | 1/2003 | Matsumoto | H01F 27/402 336/208 |
| 6,507,261 | B1 * | 1/2003 | Haga | H01F 27/306 336/208 |
| 6,842,102 | B2 * | 1/2005 | Matsumoto | H01F 5/04 335/289 |
| 8,305,180 | B2 * | 11/2012 | Wei | H02K 3/525 310/49.19 |
| 9,887,035 | B2 * | 2/2018 | Moreno Vallejo | H01F 27/02 |
| 11,646,145 | B2 * | 5/2023 | Sheehan | H01F 27/306 336/90 |
| 2011/0090037 | A1 * | 4/2011 | Tsai | H01F 27/324 336/220 |
| 2011/0115596 | A1 * | 5/2011 | Lai | H01F 27/327 336/198 |

FOREIGN PATENT DOCUMENTS

| | | | | |
|---|---|---|---|---|
| CN | 205789475 | U | * | 12/2016 |
| JP | SHO49-61012 | | | 5/1974 |
| JP | SHO51-86535 | | | 7/1976 |
| JP | SHO63-18824 | | | 2/1988 |
| JP | H03227004 | | | 10/1991 |
| JP | HE13-227004 | | | 10/1991 |
| JP | 06302438 | A | * | 10/1994 |
| JP | H06302438 | | | 10/1994 |
| JP | HEI6-302438 | | | 10/1994 |
| JP | HEI6-44117 | | | 7/1998 |
| JP | 2000 156323 | A | | 6/2000 |
| JP | 2004-319663 | | | 11/2004 |
| JP | 2007-281190 | | | 10/2007 |
| JP | 2008010660 | A | * | 1/2008 |
| JP | 2014-236128 | | | 12/2014 |
| JP | 2018163952 | A | * | 10/2018 |
| KR | 2012 0007130 | U | | 10/2012 |

OTHER PUBLICATIONS

European Patent Office “extended European search report” for corresponding European Patent Application No. 20847599.6, dated Oct. 18, 2023, 13 pp.

* cited by examiner (a)

(b)

CURRENT TRANSFORMER MODULE

TECHNICAL FIELD

This invention relates to a current transformer module used in various AC equipment and adapted to detect electric currents flowing in the equipment to provide output control and overcurrent protection operation of the equipment.

BACKGROUND ART

A current transformer is used to detect electric currents in high-power electric instruments such as air conditioners and IH devices that operate on household power supplies. A current transformer comprises a primary coil, a secondary coil, and a core for forming a magnetic path common to these coils (see, for example, Patent Document 1). In the current transformer, a current-sensing resistor is connected to the secondary coil, and the power supply commercial frequency of the instruments is energized to the primary coil. When the current in the primary coil changes, the magnetic field in the secondary coil changes through a magnetic circuit, creating a potential difference at both ends of the current-sensing resistor in the secondary coil. The difference is detected as a voltage at the current-sensing termination resistor. The instrument inputs the voltage into the microcomputer to control the inverter circuit, etc., to thereby controlling the input to or output from the instrument.

PRIOR ART DOCUMENT(S)

Patent Document

Patent Document 1: Japanese Utility Model Application Publication SHO.63-18824

SUMMARY OF THE INVENTION

Problems to be Solved by the Invention

The current transformer is housed in a resin-made casing and is used as a current transformer module. There is a demand for downsizing the current transformer module. On the other hand, the creepage distance of insulation between the primary coil and the secondary coil must be kept.

An object of the present invention is to provide a current transformer module capable of downsizing the current transformer module and keeping the creepage distance of insulation at the same time.

Means to Solve the Problems

The current transformer module of the present invention comprises:

a current transformer including a resin-made bobbin with a through hollow section and a core having legs inserted at least into the hollow section, wherein the bobbin is provided on the outer periphery of the hollow section with a primary coil and a wire-wound secondary coil; and a casing for housing the current transformer;

the bobbin having an insulation wall between the primary coil and the secondary coil wherein the insulation wall has a recess; and the casing being provided with a protrusion adapted to fit into the recess.

The primary coil is formed in a U-shaped and the secondary coil is produced by winding a thin wire member, and the casing has a contact area with a concaved surface to prevent the U-shaped primary coil from falling out.

The casing comprises an upper case and a lower case, wherein the insulation wall comprises an upper insulation wall having an upper side recess formed at a position opposed to the upper case and a lower insulation wall having a lower side recess formed at a position opposed to the lower case, and the protrusion comprises an upper side protrusion adapted to fit into the upper side recess and a lower side protrusion adapted to fit into the lower side recess.

The contact area is formed on the inner side of the upper surface of the upper case.

The current transformer module of the present invention comprises:

a current transformer including a resin-made bobbin with a through hollow section and a core having legs inserted at least into the hollow section, wherein the bobbin is provided on the outer periphery of the hollow section with a primary coil and a wire-wound secondary coil;

a casing for housing the current transformer;

the core being arranged with play in the through direction of the hollow section; and the casing being configured to house the core in a positionable way and the bobbin in a positionable way, whereby the relative position of the bobbin and the core is determined.

The casing has an inner surface intersecting the direction through the hollow section of the bobbin, wherein the inner surface is formed parallel to the outer periphery of the core and is brought into contact with the core, and the core can be positioned in the bobbin by pressing the core against the inner surface of the casing in a full-contact state.

The bobbin has an insulation wall between the primary coil and the secondary coil wherein the insulation wall has a recess, and the casing is provided with a protrusion adapted to fit into the recess, and the bobbin can be positioned in the casing by fitting the protrusion into the recess.

The core can be positioned in the casing by contacting the inside surface of the casing.

Effects of the Invention

In accordance with the present invention, the current transformer module can achieve downsizing the bobbin, while keeping the creepage distance of insulation between the primary and secondary coils by the bobbin and casing of the current transformer. As a result, the current transformer can achieve downsizing.

In accordance with the present invention, the current transformer module can determine the relative position of the bobbin and the core by positioning the bobbin and core of the current transformer to the casing.

MODE FOR CARRYING OUT THE INVENTION

Core components 31 used for current transformers (hereinafter referred to as “core components”), current transformer 10, and current transformer module 12 of one embodiment of the present invention will be explained below with reference to the drawings.

Figure 1:
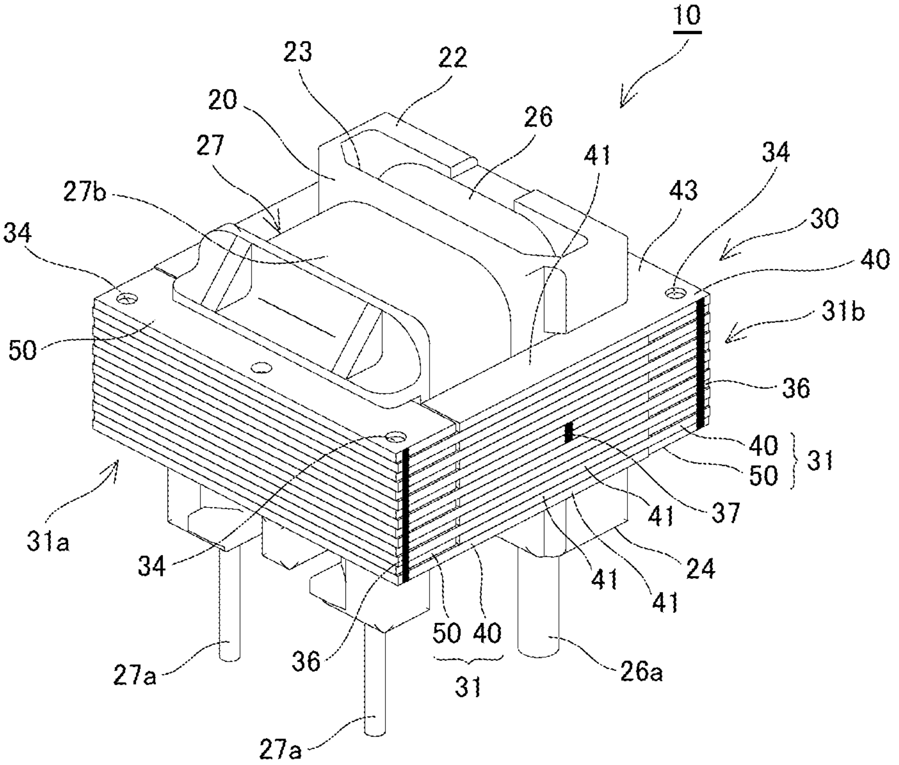
FIG. 1 is a perspective view of a current transformer of one embodiment of the present invention.

FIG. 1 is a perspective view of current transformer 10 in accordance with one embodiment of the present invention. As shown in the figure, the current transformer 10 comprises a resin-made bobbin 20 having a primary coil 26 and a wire-wound secondary coil 27, and a core 30 forming a common magnetic path for the primary coil 26 and the secondary coil 27. In the embodiment shown in the figure, the primary coil 26 is a U-shaped wire-wound member, and the secondary coil 27 is a thin wire member wound on a bobbin 20 and protected by a tape around the periphery.

Figure 2:
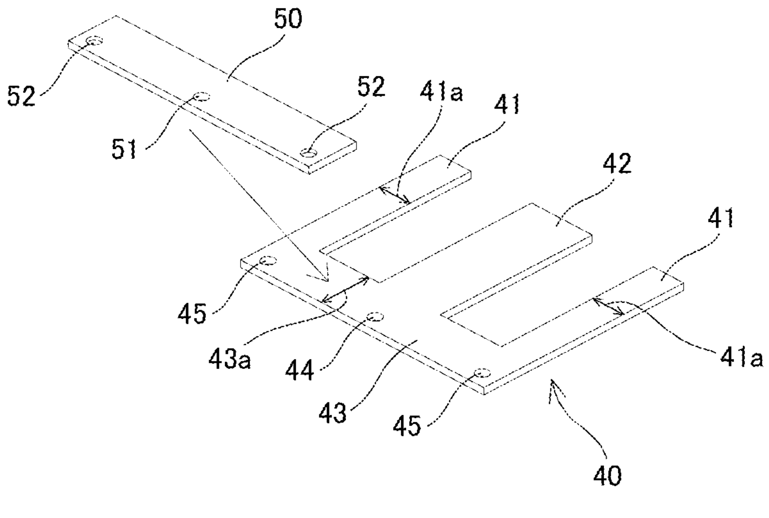
FIG. 2 is an exploded perspective view of a core component for the current transformer.

The core 30 is composed of a plurality of core components 31 that were stacked together. FIG. 2 is an exploded perspective view of one core component 31 that makes up the core 30. The core component 31 may comprise E-type core 40 and an I-type core 50, as shown in the figure. E-type core 40 and I-type core 50 can be prepared by press-punching an electromagnetic steel sheet such as a silicon steel sheet. For example, the electromagnetic steel sheet may be in the form of a thin strip.

E-type core 40 comprises three rectangular-shaped legs 41, 42, 41 extending substantially parallel to each other, and a rectangular-shaped connecting part 43 connected at proximal ends the legs 41, 42, 41. The width dimension 43*a* of the connecting part 43 is preferably longer than the width dimension 41*a* of the leg 41 to suppress magnetic flux leakage. The I-type core 50 may be a rectangular shape with the same size as the connecting part 43. E-type core 40 and I-type core 50 preferably have pilot holes 44, 51 for positioning them. Furthermore, the longitudinal dimension of I-type core 50 is preferred to be 0.1 mm to 0.3 mm smaller than the longitudinal dimension of the connecting part 43 of E-type core 40 to make positioning and stacking of I-type 50 on E-type core 40 easier.

I-type core 50 is placed on and bonded to the connecting part 43 of E-type core 40 to form a single-piece core component 31. E-type core and I-type core are bonded, for example, by crimping 34 shown in FIGS. 3 and 4, welding 35 shown in FIG. 5, or applying glue (not shown).

Figure 3:
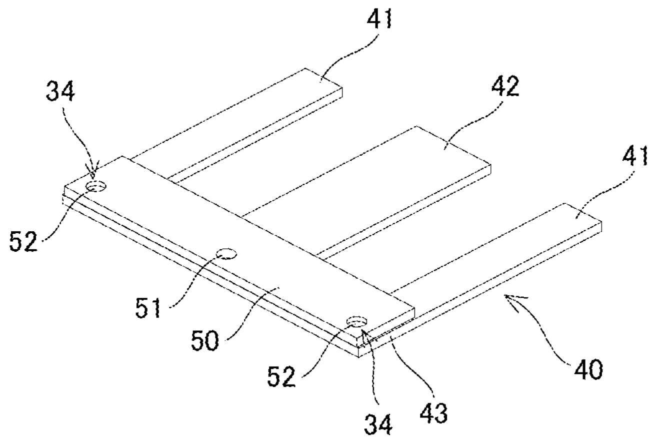
FIG. 3 shows a single-piece core component formed from E-type core and I-type core bonded by crimping, wherein (a) is a perspective view and (b) is a cross-sectional view.
Figure 3:
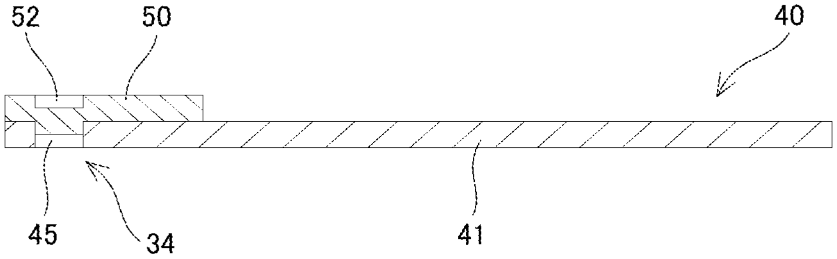
Figure 4:
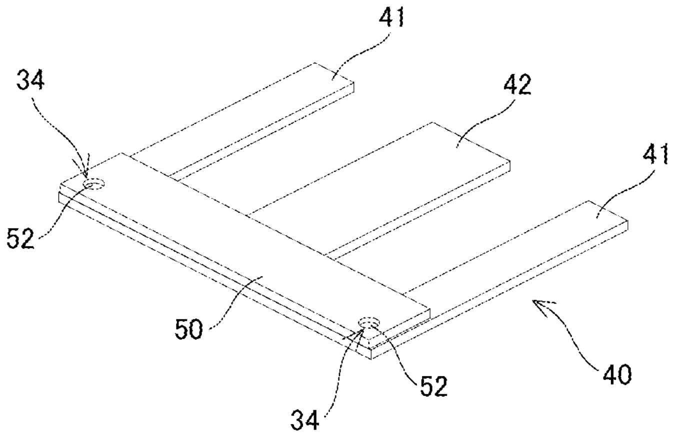
FIG. 4 is a perspective view of one embodiment without a pilot hole and shows a single-piece core component of E-type core and I-type core bonded by crimping.

In one embodiment, crimping 34 is used to combine E-type core 40 and I-type core 50 into a single-piece core component. In this case, crimp holes 45 are formed in one of E-type core 40 or I-type core 50, and dowels 52 are provided on the other of E-type core 40 or I-type core 50, as shown in FIG. 2. Then, as shown in FIGS. 3 (*a*) and 3 (*b*), E-type core 40 and I-type core 50 are stacked while aligning the crimp holes 45 and dowels 52, and subject to the crimping process. The crimp hole 45 can be formed at the same time when E-type core 40 or I-type core 50 is prepared by press-punching. The crimp holes 45 are preferably formed in E-type core 40 having a larger area to suppress reduction of strength and deformation of the core 30.

Figure 5:
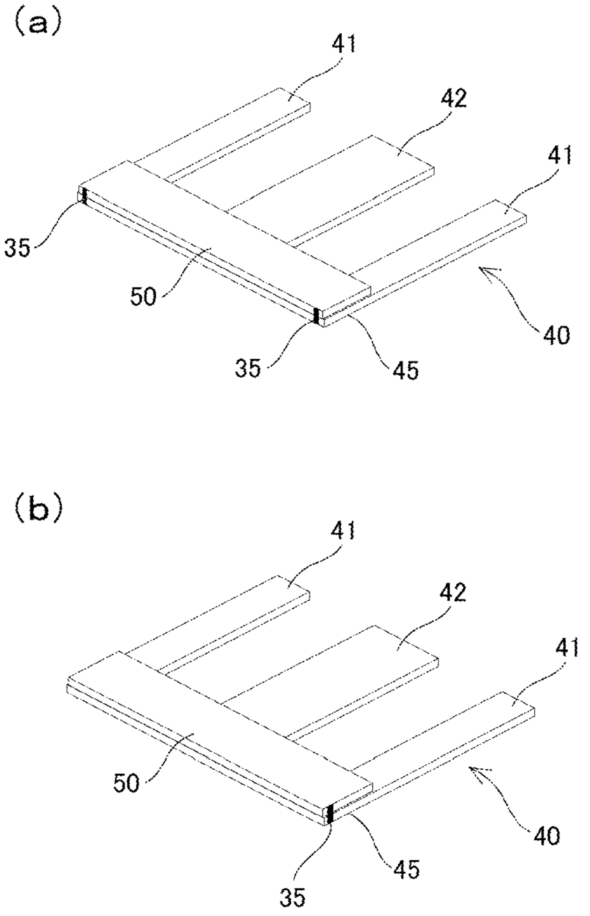
FIG. 5 is a perspective view of a core component bonded by welding E-type core and I-type core, wherein (a) is an embodiment of weld applied to the end edge and (b) is an embodiment of weld applied to the side face.

In another embodiment, welding 35 is used to combine E-type core 40 and I-type core 50 into a single-piece core component. In this case, welding is performed between the outer edge of the connecting part 43 of E-type core 40 and the outer edge of I-type core, as shown in FIG. 5 (*a*). Welding 35 may be applied at opposed ends of the connecting part 43 of E-type core 40 and I-type core 50, as shown in FIG. 5 (*b*). Examples of welding 35 include laser welding and resistance welding (the same is applied to welding in the description below) but are not limited to them.

Figure 6:
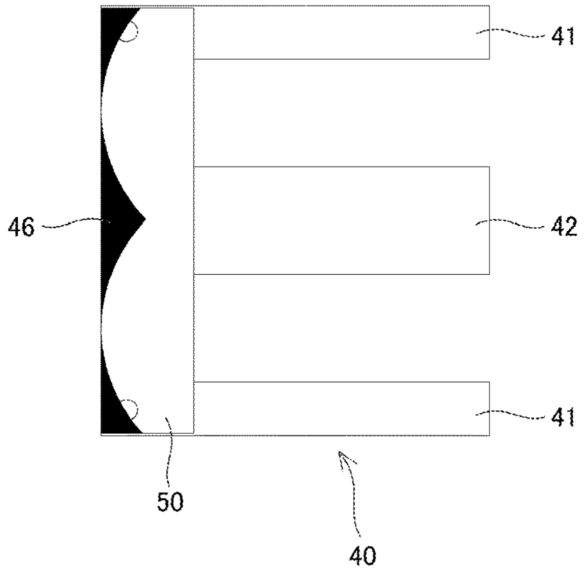
FIG. 6 is a plan view showing the region of low magnetic flux density in the core components mounted on the current transformer.

When E-type core 40 and I-type core 50 are interconnected by weld 35, the magnetic properties of the welded area and its vicinity may deteriorate. For this reason, as shown in FIG. 6, welding 35 is performed preferably on the region 46 of low magnetic flux density in the core components 31, i.e., on the corners and the central area near the outer edge of E-type core 40 and I-type core 50. Because the area 46 has a low magnetic flux density in the magnetic path, the influence on performance is suppressed even if the magnetic property becomes lower to a certain extent.

As shown in FIGS. 3 and 5, a plurality of core components 31 consisting of a single-piece core components of E-type core 40 and I-type core 50 are prepared (core component preparing step). The core components 31 are mounted on the bobbin 20. For example, the bobbin 20 has a U-shaped primary coil 26 and a wire-wound secondary coil 27 protected by the tape around the periphery, as shown in FIG. 7, and a through hollow section 21 in the direction perpendicular to the coils 26, 27 (bobbin preparing step).

Figure 7:
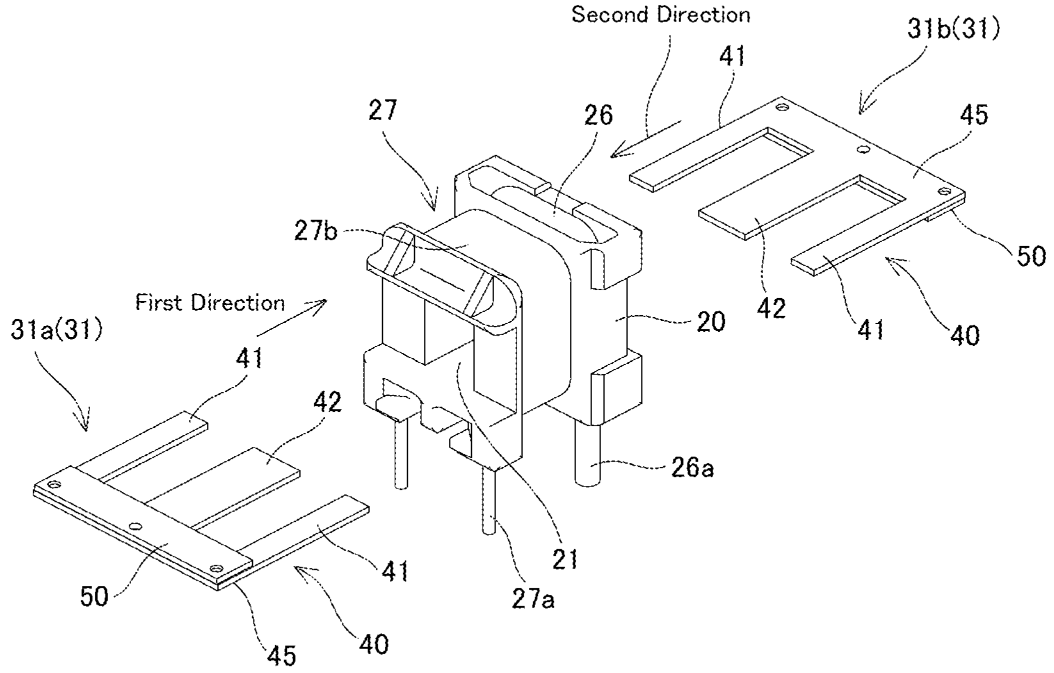
FIG. 7 is a side elevational view showing the process of inserting the core component into the bobbin having a primary coil and a wire-wound secondary coil.
Figure 8:
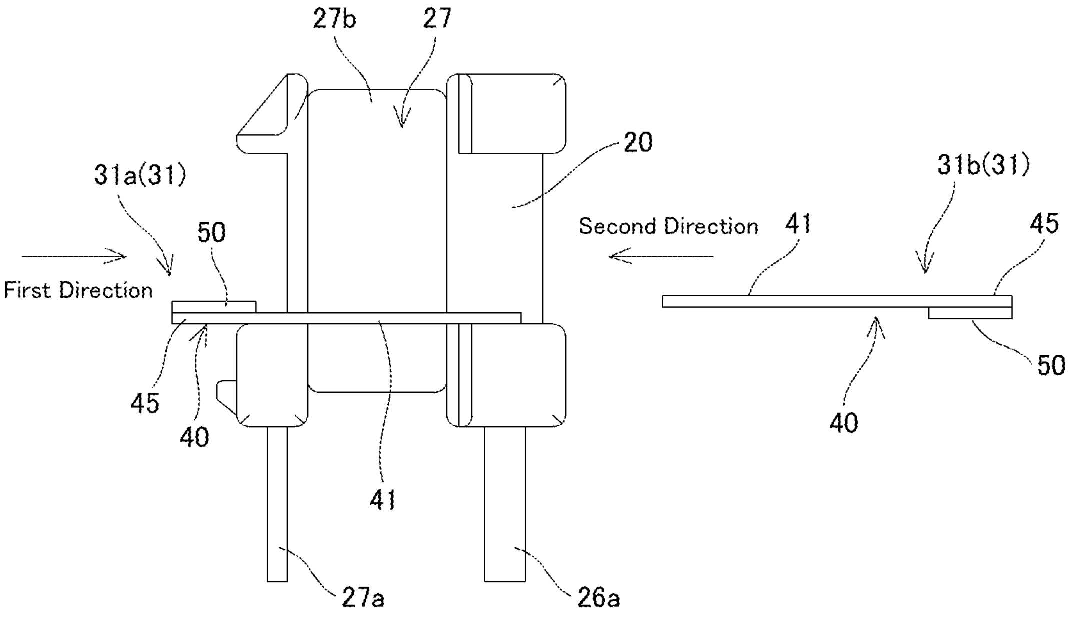
FIG. 8 is a longitudinal sectional view showing the process of inserting the core component into the bobbin having a primary coil and a wire-wound secondary coil.

As shown in FIGS. 7 and 8, the core component 31 is stacked by sequentially inserting the central leg 42 into the hollow section 21 of the bobbin 20. Specifically, as shown in the figure, the core components 31 and 31 are inserted into the hollow section 21, alternately and interchanging the top and bottom of the core component. For example, in FIGS. 7 and 8, the direction from left to right on the paper is referred to as a first direction, and the direction from right to left and opposite the first direction is referred to as a second direction. The first core component 31*a* having I type core 50 on top of the E-type core 40 is arranged to approach the bobbin 20 from the first direction, and then the central leg 42 is inserted into the hollow section 21 with legs 41, 42, 41 facing toward the bobbin 20. The second core component 31*b* having I type core 50 under the E-type core 40 is arranged to approach the bobbin 20, and then the central leg 42 is inserted into the hollow section 21 from the second direction with legs 41, 42, 41 facing toward the bobbin 20. Thus, the legs 41, 42, 41 of the second component 31*b* is placed on the legs 41, 42, 41 of the first component 31*a*. In the following, the core component that is inserted from the first direction is referred to as the first core component 31*a*, and the core component that is inserted from the second direction is referred to as the second core component 31*b*. Subsequently, the first core component 31*a* is inserted from the first direction, and the second core component 31*b* is inserted from the second direction, whereby the first core components 31*a* and the second core components 31*b* are stacked in the state where legs 41, 42, 41 (42 is not shown) are superimposed (stacking step).

Figure 9:
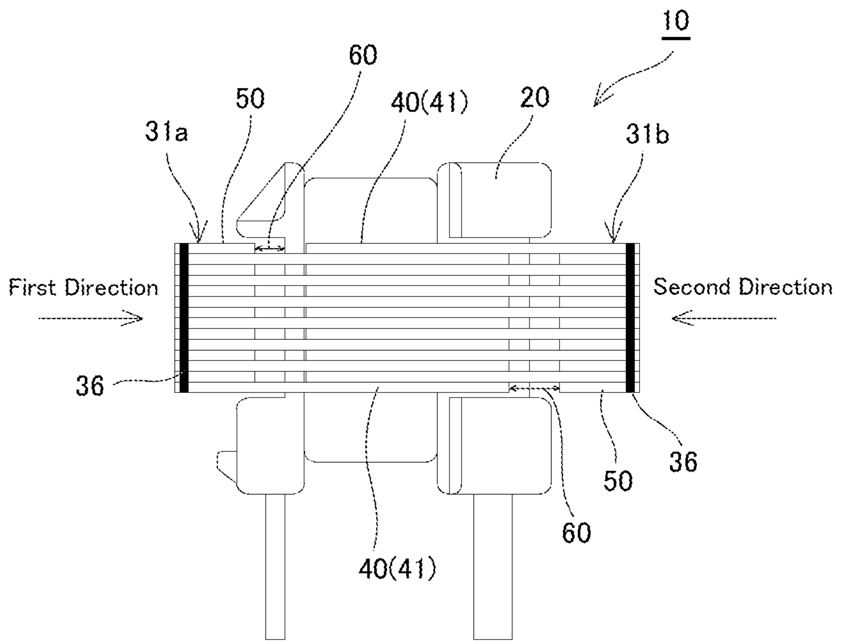
FIG. 9 is a side elevational view showing the status wherein a group of core components inserted into the bobbin from a first direction are joined by welding, and a group of core components inserted into the bobbin from a second direction are joined by welding.

In this state, however, the first core components 31*a* and the second core components 31*b* have not been fixed yet and remain inserted in the hollow section 21. Therefore, as shown in FIG. 9, a stack of the first core components 31*a* is aligned at the respective edges and then combined in a single core component block, and a stack of the second core components 31*b* is aligned at the respective edges and then combined in a single core component block, to prevent them from falling apart (block forming step). A single core component block can be made by a weld, for example, as shown by reference number 36 in FIG. 9. Examples of welding include laser welding or resistance welding. In addition, crimping or bonding may use to form the single-piece core component. A weld 36, if applied, is desirable to perform at the area of low magnetic flux density 46, as described above with reference to FIG. 6.

In the current transformer 10 including a block of the first core components 31*a* and a block of the second core components 31*b*, a gap 60 is formed between distal ends of legs 41, 42, 41 of the first core component 31*a* and an inner-side end edge of I-type core 50 of the second core component 31*b*. A gap 60 is also formed between distal ends of legs 41, 42, 41 of the second core component 31*b* and an inner-side end edge of I-type core 50 of the first core component 31*a*. A spacing of the gap 60 can be adjusted by pushing the first core component 31*a* from the first direction and the second core component 31*b* from the second direction (gap adjusting step).

Figure 10:
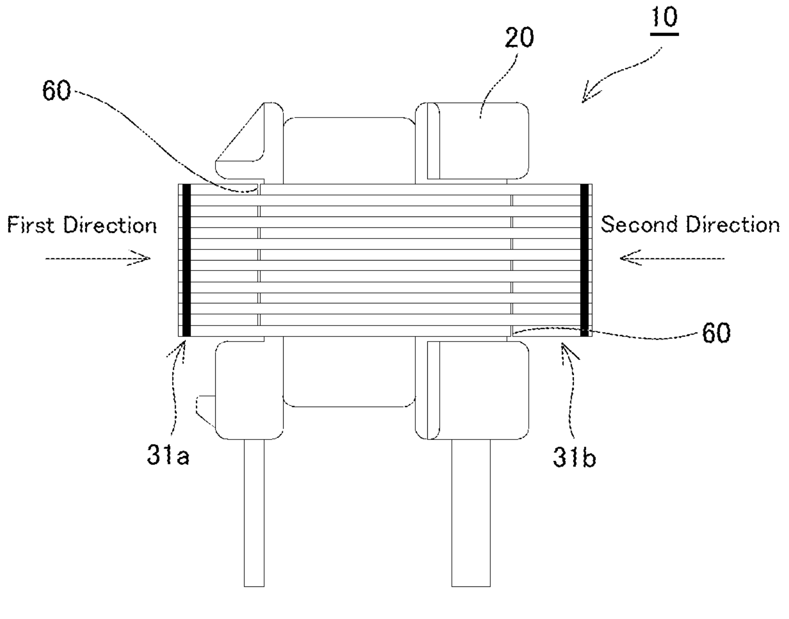
FIG. 10 is a side elevational view showing the process of adjusting a spacing of gap formed between the core component inserted from the first direction and combined into a single core component and the core component inserted from the second direction and combined into a single core component.

Adjusting the gap 60 can be performed, as shown by the arrows in FIGS. 9 and 10, by pushing the first core component 31*a* from the first direction and the second core component 31*b* from the second direction while referring to the output voltage characteristics of current transformer 10. Therefore, the output voltage of the current transformer 10 can be adjusted with high precision, and the tolerances can be made as small as possible by adjusting the spacing of the gap 60, even when there occurred a variation in the magnetic characteristics of the core material or in the temperature during the annealing process for the heat treatment of the core. In accordance with the present invention, the tolerance can be up to ±1% in terms of the actual measured value, preferably up to ±0.5%. For example, the spacing of the gap 60 can be 0.1-0.4 mm, preferably about 0.2 mm.

After the adjustment of gap 60 is completed, the first core component 31*a* and the second core component 31*b* are joined by weld 37 or other means at the overlapped legs 41, 41 on the outside position (joining step). Since the first and second core components 31*a* and 31*b* are joined, the gap 60, once adjusted, can be prevented from changing the determined distance. Each of the first and second core components 31*a* and 31*b* is combined into a single core component block before this joining step. Therefore, welding 37 for joining the first and second core components 31*a* and 31*b* may be a spot welding only at one or more places. Therefore, the magnetic properties of the core components 31*a* and 31*b* are not substantially affected by welding 37.

In the current transformer 10 of the present invention, the first core component 31*a* and the second core component 31*b* can be made into single core component blocks without using varnish, glue, or resin. Therefore, the current transformers are not affected by thermal expansion and contraction and provide excellent temperature characteristics.

Figure 12:
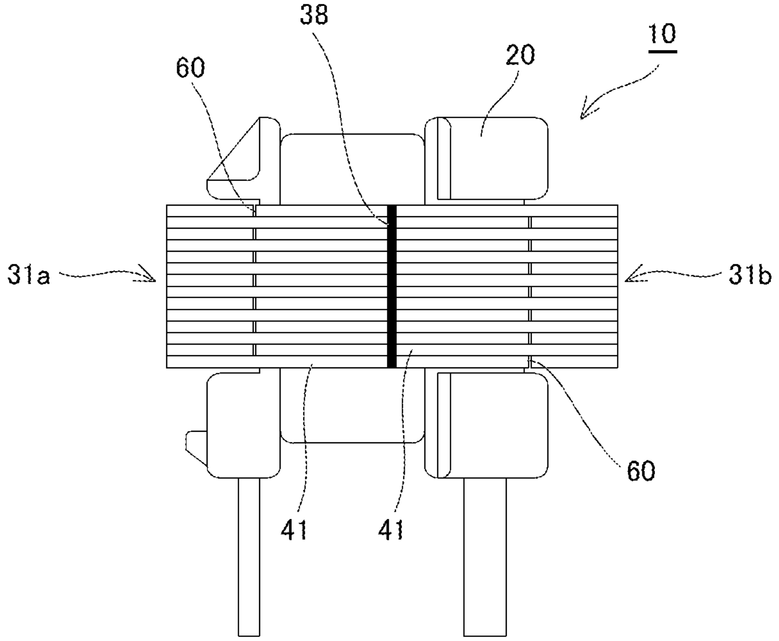
FIG. 12 is a side elevational view showing one embodiment wherein after adjusting the spacing of gap, the core component inserted from the first direction and the core component inserted from the second direction are joined to each other to form a single core component block.

In the above explanation, after a stack of the first core component 31*a* and a stack of the second core component 31*b* are formed, the spacing of gap 60 is adjusted, and then the stacks of the first and second core components 31*a* and 31*b* are joined to each other. However, for example, a spacing of the gap 60 may be adjusted without applying weld 36 to the stacks of the first and second core components 31*a* and 31*b*, as shown in FIG. 9. In this case, after adjusting the gap 60, the legs 41, 41 located on the outside the first and second core components 31*a* and 31*b* can be joined at the overlapped positions thereof with line welding 38, as shown in FIG. 12. This simplifies the manufacturing process of the current transformer 10.

Figure 11:
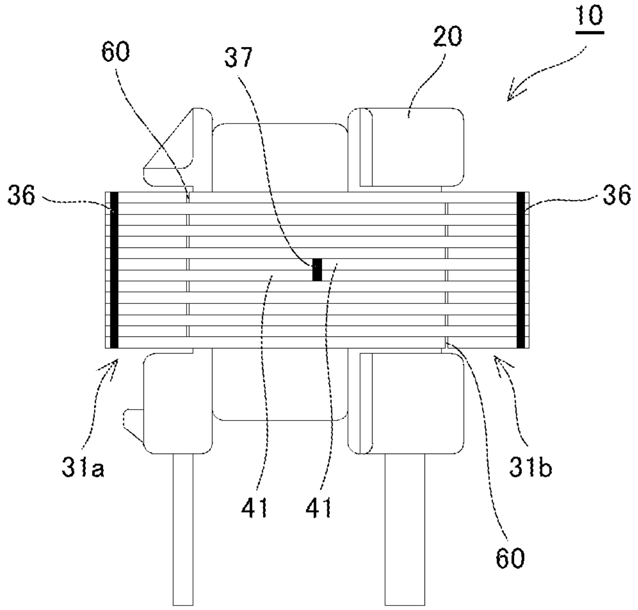
FIG. 11 is a side elevational view showing the status wherein after adjusting the spacing of gap, the core component inserted from the first direction and combined into a single core component and the core component inserted from the second direction and combined into a single core component are joined to each other by spot welding to form a single core component block.

In accordance with the present invention, the first core components 31*a* and the second core component 31*b* are welded 37, 38 at substantial central part of the legs 41 of E-type core 40, as shown in FIGS. 11 and 12. Therefore, the length of linear expansion is suppressed to half. In addition, the first core components 31*a* and the second core components 31*b* expand linearly in the same direction starting from the welds 37, 38. As a result, the gap 60 remains almost unchanged. Welds 36 and 37 in FIG. 11 and weld 38 in FIG. 12 are formed substantially parallel with the stacking direction of the first and second core components 31*a* and 31*b*. So, the linear thermal expansion of these welds does not affect the dimension of the gap 60.

Figure 13:
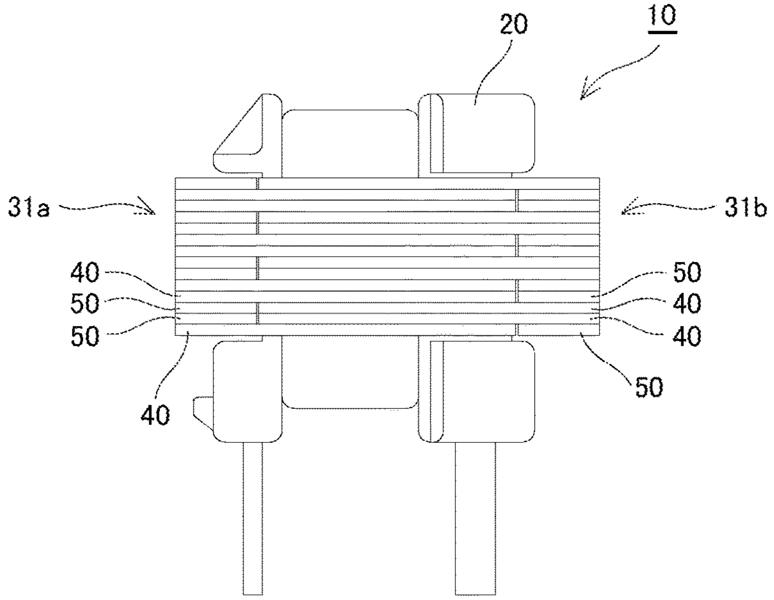
FIG. 13 is a side elevational view showing one embodiment wherein the order of placing the top surface and the bottom surface is changed when the core components are stacked.

In the embodiment mentioned above, all the first core components 31*a* are stacked with I-type core 50 facing up, and all the second core components 31*b* are stacked with I-type core 50 facing down. However, if the first core component 31*a* and the second core component 31*b* are paired, as shown in FIG. 13, their top surface and bottom surface can be changed alternately, or every multiple pairs, or even randomly. This makes it possible to equalize the thickness variation caused by burrs 73 and slope shaped, sheared surfaces 70 (shown in FIG. 14) when E-type core 40 and I-type core 50 are prepared by press-punching works.

Figure 14:
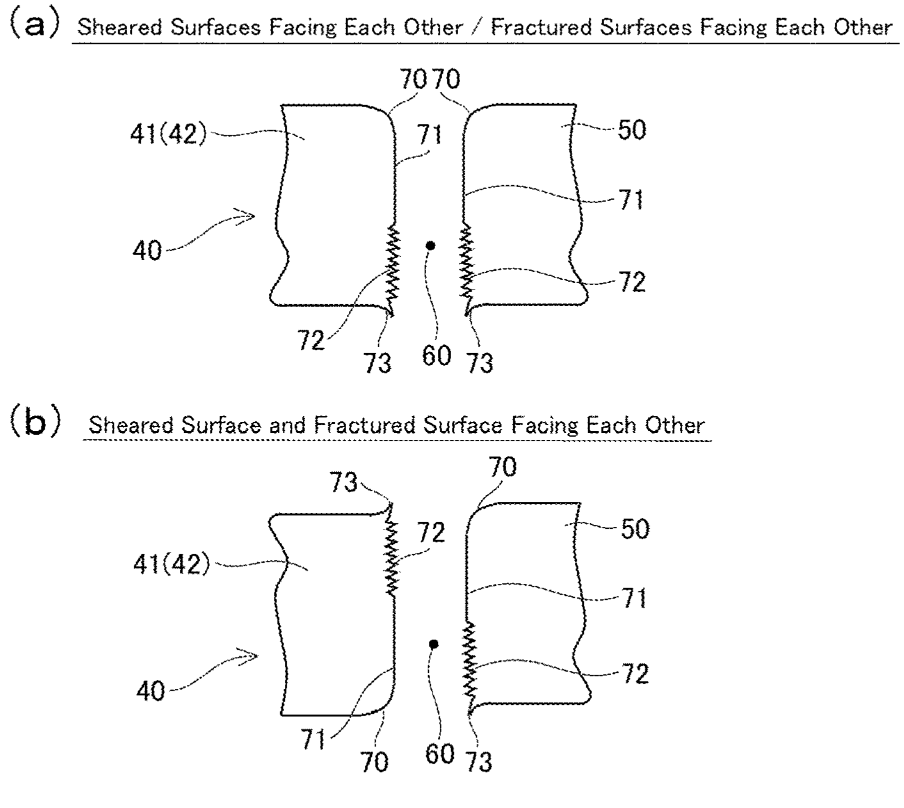
FIG. 14 is an enlarged view showing the butt portion between the E-type core and the I-type core (both made by press-punching process) opposing to each other across the gap wherein (a) is an embodiment of the sheared surfaces facing each other and the fractured surfaces facing each other, and (b) is an embodiment of the sheared surface and the fractured surface facing each other.
Figure 15:
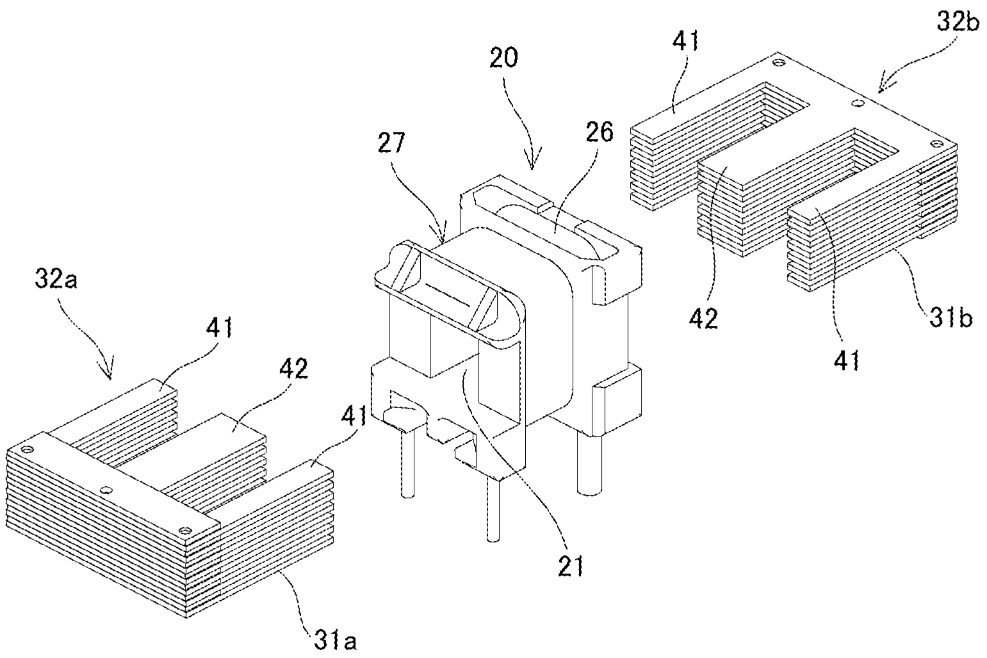
FIG. 15 is a perspective view showing one embodiment of manufacturing the current transformer wherein a single core component block is inserted into the bobbin from the first direction, and a single core component block is inserted into the bobbin from the second direction.

FIGS. 14 (*a*) and 14 (*b*) are enlarged views showing the butt portion between the distal ends of legs 41, 42, 41 of E-type core 40 of the first core component 31*a* and the inner end face of I-type core 50 of the second core component 31*b*. When E-type core 40 and I-type core 50 are made by the press-punching process, end faces of E-type core 40 and I-type core 50 have rounded, slope shaped, sheared surfaces 70 on the corners, sheared surface 71 with striations formed in the thickness direction, fractured surface 72 with unevenness as if the material was plucked, or jagged burrs 73 protruding from the end face in the punching direction, as shown in FIG. 14. When E-type core 40 and I-type core 50 are placed such that the sheared surface 71 and the sheared surface 71 face each other, and the fractured surface 72 and the fractured surface 72 face each other, as shown in FIG. 14 (*a*), the fractured surfaces 72, 72 come into contact but a gap remains between the sheared surfaces 71, 71, resulting in that the adjustable range of the spacing of the gap becomes smaller, and the adjustable range of the output voltage also becomes narrower. Therefore, it is preferable to arrange E-type core 40 and I-type core 50 such that the sheared surface 71 and the fractured surface 72 are opposed to each other, as shown in FIG. 14 (*b*). This allows the gap 60 to be smaller, thus increasing the adjustable range of the gap 60 and the output voltage and making it easier to adjust them.

Other Embodiments

In the above embodiment, the first core component 31*a* and the second core component 31*b* are inserted into the hollow section 21 one by one. However, in another embodiment as shown in FIG. 5, the first core components 31*a* are stacked and then integrated into a block by welding or crimping to form a first core component block 32*a*, and the second core components 31*b* are stacked and then integrated into a block by welding or crimping to form a second core component block 32*b*. When the first and second core component blocks 32*a*, 32*b* are mounted on a bobbin 20, leg 41 of the second core component 31*b* is disposed in between legs 41, 41 of the first core components 31*a*, 31*a*, and leg 41 of the first core component 31*a* is disposed in between legs 41, 41 of the second core components 31*b*, 31*b*. With this embodiment, it is not necessary to stack core components 31*a*, 31*b* one by one in the bobbin 20, making the manufacturing process simple to the greatest extent.

Figure 16:
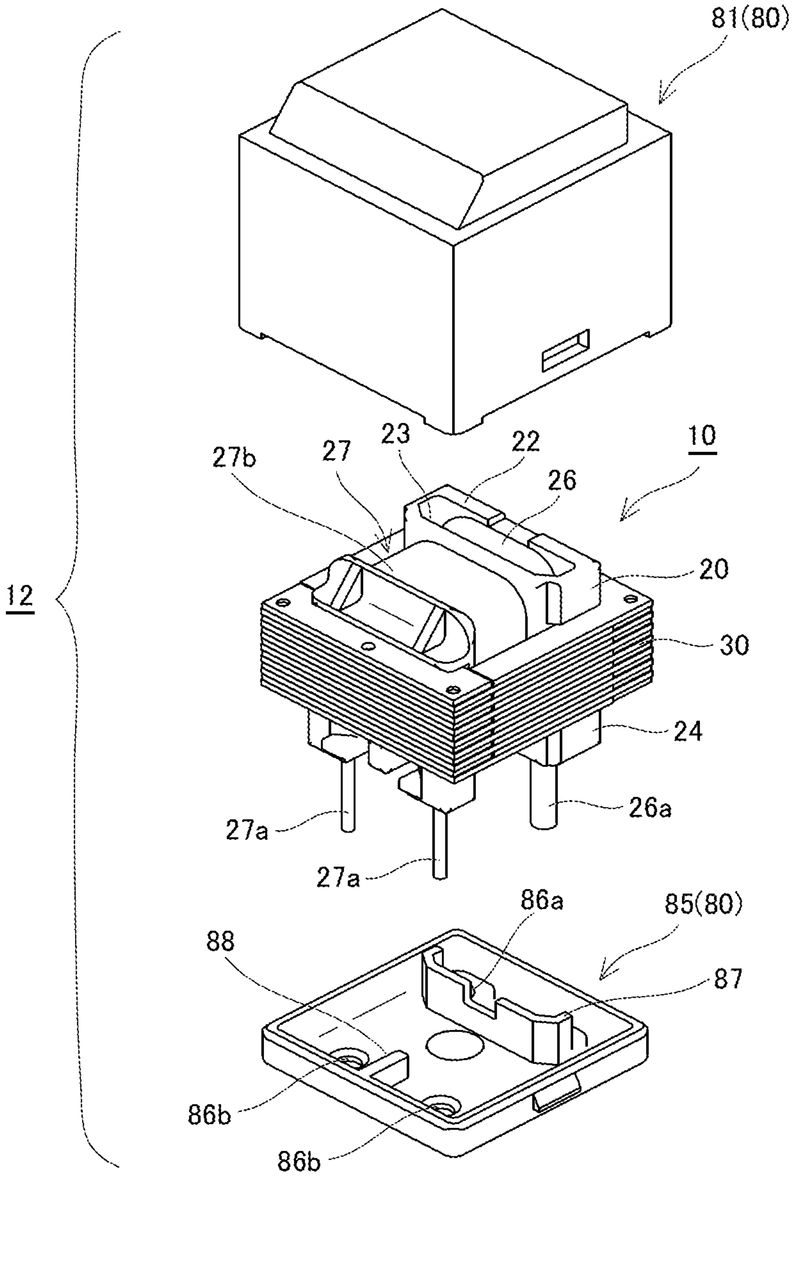
FIG. 16 is an exploded view of the current transformer module in accordance with the present invention.
Figure 17:
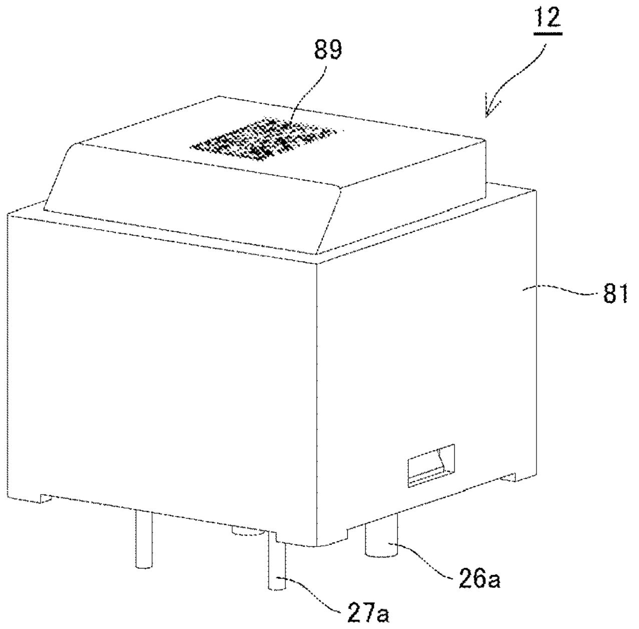
FIG. 17 is a perspective view showing the current transformer module.
Figure 18:
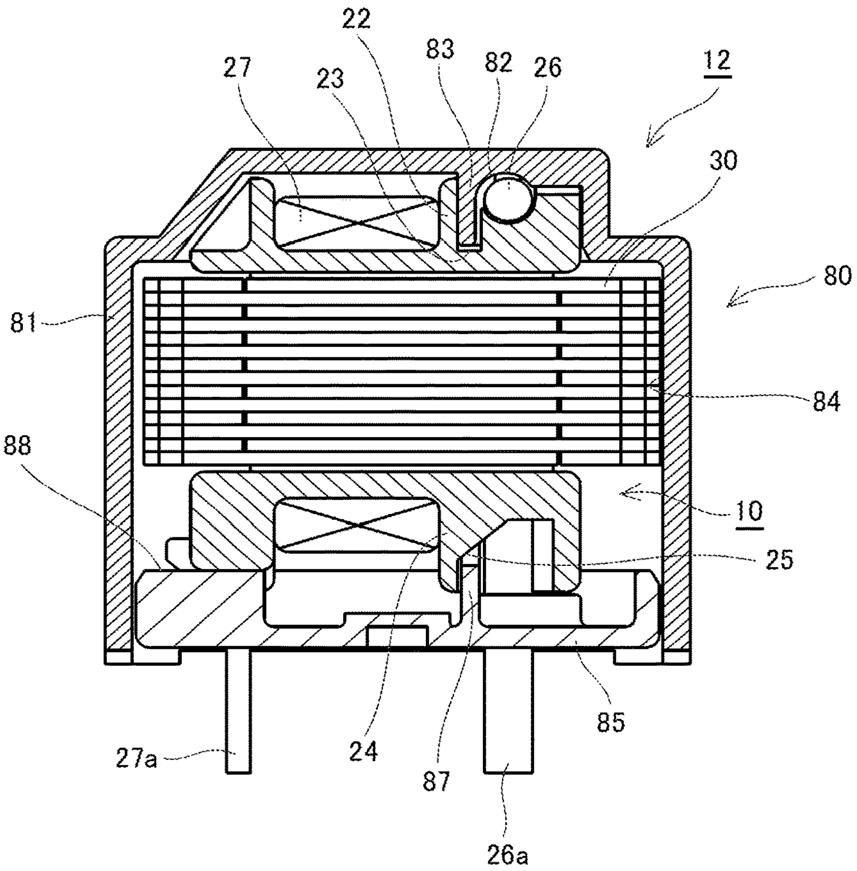
FIG. 18 is a cross-sectional view of the current transformer module.
Figure 19:
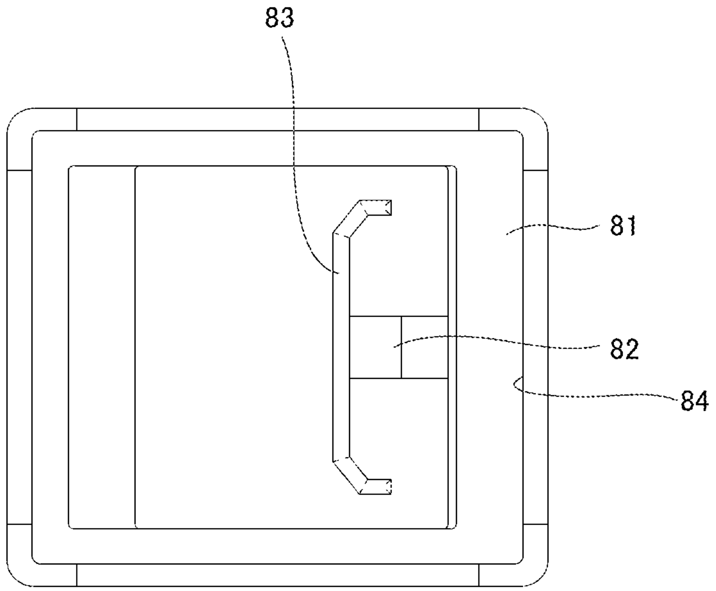
FIG. 19 is a bottom view of an upper case.
Figure 20:
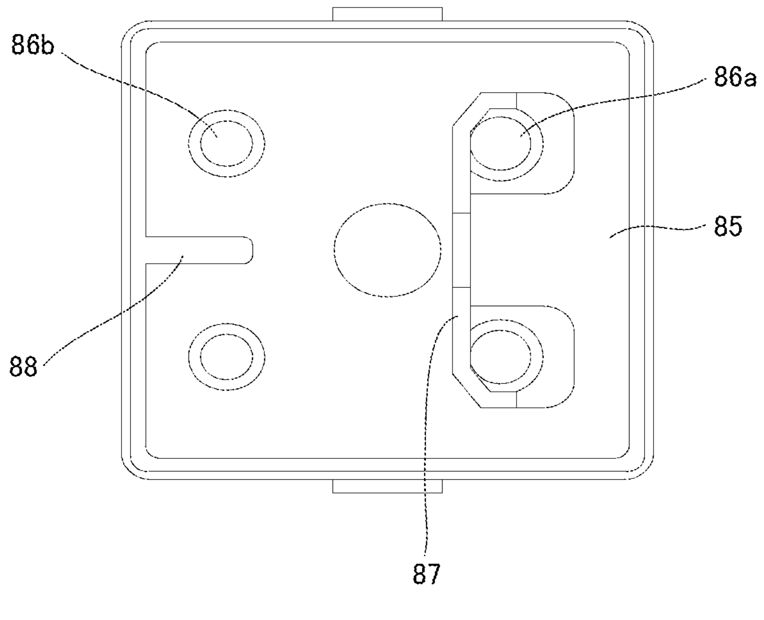
FIG. 20 is a plan view of a lower case.

The current transformer 10 obtained by the above can be accommodated in a casing 80, for example, and used as a current transformer module 12. FIG. 16 is an exploded perspective view of the current transformer 10 and the casing 80 for housing it. FIG. 17 is a perspective view of the current transformer 10, and FIG. 18 is a longitudinal cross-sectional view of the current transformer 10. As shown in the figures, the casing 80 comprises an upper case 81 and a lower case 85. The upper case 81 is a box-like shape with an opening on its underside and is configured to house the core 30 and bobbin 20. The lower case 85 may be a plate-like shape configured to place the bobbin 20 thereon and to close the lower surface of the upper case 81. FIG. 19 shows a bottom view of the upper case 81, and FIG. 20 shows a plan view of the lower case 85.

The lower case 85 has insertion holes 86*a*, 86*b*, through which the terminal wires 26*a*, 26*a* of the primary coil 26 and the terminal wires 27*a*, 27*a* of the secondary coil 27 extend out, respectively. As shown in FIGS. 16 and 18, the current transformer module 12 is produced by inserting the respective terminal wires 26*a*, 26*b* into the insertion holes 86*a*, 86*b* and fitting the upper case 81 with the bobbin 20 positioned in the lower case 85. The obtained current transformer module 12 is shown in FIG. 17.

After the current transformer module 12 is made, the output voltage characteristics are individually measured, and the obtained characteristic data can be printed or sealed on the upper case as a data matrix 89, as shown in FIG. 17. When the current transformer module 12 is introduced into AC equipment, the characteristics data read by the data matrix 89 can be adjusted on the control. This contributes to achieving more accurate output voltage characteristics.

As for a combination of the current transformer 10 and the casing 80 mentioned above, there is a demand for downsizing the current transformer module 12. To downsize the current transformer module 12, the current transformer 10 must be smaller. As shown in FIGS. 16 and 18, the protruding heights of the upper and lower insulating walls 22 and 24, which insulate the area between the primary and secondary coils 26 and 27 on the bobbin 20, need to be lowered. On the other hand, the creepage distance (shortest distance measured along the surface of the insulation) must be kept for insulating the primary coil 26 from the secondary coil 27.

In accordance with the present invention, as shown in FIGS. 16 and 18, the bobbin 20 is provided with an upper insulation wall 22 between the primary coil 26 and the secondary coil 27, and is also formed with an upper side recess 23 between the upper insulation wall 22 and the primary coil 26. On the other hand, the upper case 81 has an upper side protrusion 83 adapted to fit into the upper side recess 23, as shown in FIGS. 18 and 19.

When the current transformer 10 is housed in the upper case 81, the upper side protrusion 83 of the upper case 81 fits into the upper side recess 23 of the bobbin 20. This makes up an insulating wall and provides a longer creepage distance of insulation between the primary coil 26 and the secondary coil 27. Since the upper side protrusion 83 fits into the upper side recess 23, the bobbin 20 can be adequately positioned in the upper case 81.

The upper case 81 is formed on the inner side of the upper surface with a recess along the outer shape of the primary coil 26 as a contact area 82 that restrains the primary coil 26 from coming loose. This contact area 82 prevents the primary side coil 26 from being lifted when the current transformer module 12 is mounted on a printed circuit board or the like.

As shown in FIG. 18, the bobbin 20 is provided with a lower insulation wall 24 between the primary coil 26 and the secondary coil 27, and is also formed with a lower side recess 25 between the lower insulation wall 24 and the primary coil 26. On the other hand, the lower case 85 has a lower side protrusion 87 adapted to fit into the lower side recess 25, as shown in FIGS. 16, 18 and 19.

When the current transformer 10 is placed on the lower case 85, the lower side protrusion 87 fits into the lower side recess 25 of the bobbin 20. This makes up an insulating wall and provides a longer creepage distance of insulation between the primary coil 26 and the secondary coil 27.

Thus, the current transformer 10 and the current transformer module 12 can be downsized by lowering the heights of the upper and lower insulating walls 22 and 24 of the bobbin 20 while keeping the creepage distance between the primary coil 26 and the secondary coil 27. In addition, since the lower side protrusion 87 fits into the lower side recess 25, the bobbin 20 can be adequately positioned in the lower case 85.

The lower case 85 is preferably provided with a step portion 88 to support the lower surface of the bobbin 20. When the bottom surface of the bobbin 20 contacts the step portion 88 of the lower case 85, the bobbin 20 can be held in the casing 80 without tilting.

Concerning the current transformer 10 of the present invention, the gap 60 can be adjusted while referring to the output voltage characteristics. Hence, the core 30 has some play against the bobbin 20 in the longitudinal direction of the legs 41, depending on the width of the gap 60. This may cause the core 30 to slide in the passage direction of the hollow section 21, resulting in the rattling in the current transformer module 12. Therefore, the current transformer module 12 is preferably required to determine the position of core 30 relative to the bobbin 20 to avoid this rattling.

As described above, the position of bobbin 20 in the casing 80 is determined by the engagement between the upper side recess 23 and the upper side protrusion 83 and between the lower side recess 25 and the lower side protrusion 87. In this case, if the position of the core 30 can be determined relative to the casing 80, the positions of the core 30 and the bobbin 20 can also be determined relative to the casing 80. In accordance with this embodiment, the structure to determine the position of the core 30 relative to the casing 80 is employed, as shown in FIG. 18. Specifically, one of the inner surfaces 84 of the upper case 81 is brought into contact with the core 30, in the state where the upper case 81 is positioned relative to the bobbin 20, such that the connecting part 43 of E-type core 40 and I-type core 50 can be sandwiched by the bobbin 20 and the inner surface 84 of the upper case 81. Thus, the core 30 is pressed against the bobbin 20 so that the positions of the core 30 and the bobbin 20 are determined, preventing the occurrence of rattling.

The above description is intended to explain the invention and should not be construed as limiting or reducing the scope of the invention as described in the claims. The present invention is not limited to the above examples, and of course various variations are possible within the technical scope of the claims.

For example, core 30 of the current transformer 10 comprises the first core component 31*a* and the second core component 31*b*, each having bonded E-type core 40 and I-type core 50 but is not limited to this example.

EXPLANATION OF REFERENCE NUMBERS

10 Current transformer
11 Current transformer module
20 Bobbin
21 Hollow section
22 Upper side insulation wall
23 Upper side recess
24 Lower side insulation wall
25 Lower side recess
30 Core
80 Casing
81 Upper case
83 Upper side protrusion
84 Inner surface
85 Lower case
87 Lower side protrusion

The invention claimed is:

1. A current transformer module comprising:

a current transformer including a resin-made bobbin having a through hollow section and a core having legs inserted at least into the hollow section, wherein the bobbin is provided on the outer periphery of the hollow section with a U-shaped primary coil and a thin wire-wound secondary coil; and a casing for housing the current transformer;

the casing has a contact area with a recess configured to contact the U-shaped primary coil to prevent the U-shaped primary coil from falling out.

2. The current transformer module according to claim 1, wherein the bobbin has an insulation wall between the primary coil and the secondary coil wherein the insulation wall has a recess, and the casing is provided with a protrusion configured to fit into the recess of the insulation wall.

3. The current transformer module according to claim 2, wherein the casing comprises an upper case and a lower case, the insulation wall comprises an upper insulation wall having an upper side recess formed at a position opposed to the upper case and a lower insulation wall having a lower side recess formed at a position opposed to the lower case, the protrusion comprises an upper side protrusion adapted to fit into the upper side recess and a lower side protrusion adapted to fit into the lower side recess, and the contact area is formed on the inner side of the upper surface of the upper case.

* * * * *